Feb. 24, 1925.

W. F. PROBST 1,527,747

VARIABLE FEEDER

Filed May 5, 1921
2 Sheets-Sheet 1

Inventor
William F. Probst
by Eeper & Popp
Attorneys

Feb. 24, 1925.  
W. F. PROBST  
VARIABLE FEEDER  
Filed May 5, 1921
1,527,747
2 Sheets-Sheet 2
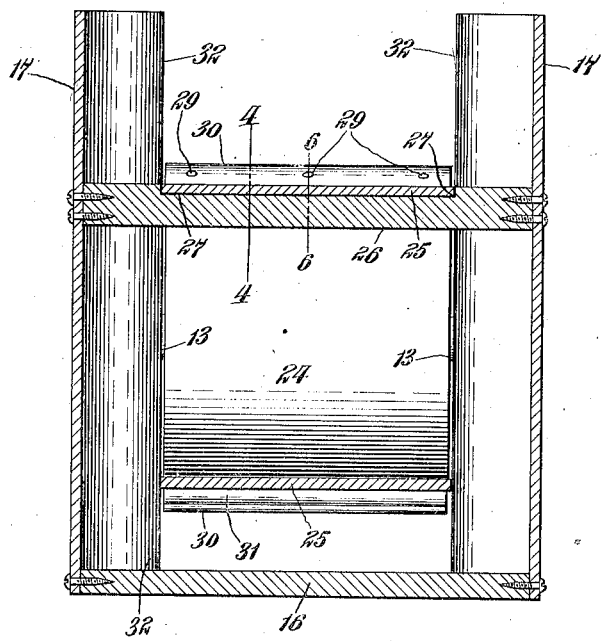
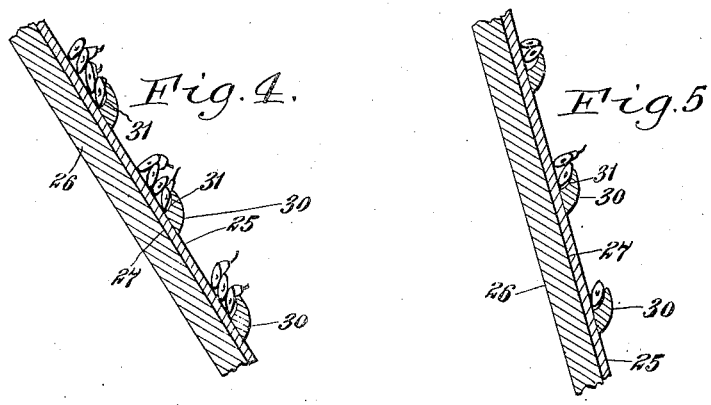
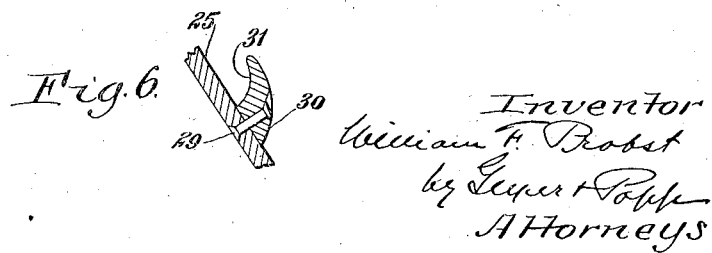
Inventor  
William F. Probst  
by Seyfert & Roffe  
Attorneys Patented Feb. 24, 1925.

1,527,747

UNITED STATES PATENT OFFICE.

WILLIAM F. PROBST, OF CHILLICOTHE, OHIO, ASSIGNOR TO PEERLESS HUSKER COMPANY, OF BUFFALO, NEW YORK, A COPARTNERSHIP.

VARIABLE FEEDER.

Application filed May 5, 1921. Serial No. 466,936.

*To all whom it may concern:*

Be it known that I, WILLIAM F. PROBST, a citizen of the United States, residing at Chillicothe, in the county of Ross and State of Ohio, have invented new and useful Improvements in Variable Feeders, of which the following is a specification.

This invention relates to a feeding mechanism for continuously and automatically feeding vegetables and other material into a discharge hopper in constant, uninterrupted small quantities, said vegetables or other material being supplied more or less irregularly to said feeding mechanism in comparatively large amounts.

The object of the invention is to permit of not only feeding the material in regular quantities and in definite alinement, but also to permit of adjustably varying the amount of material fed.

Figure 1:
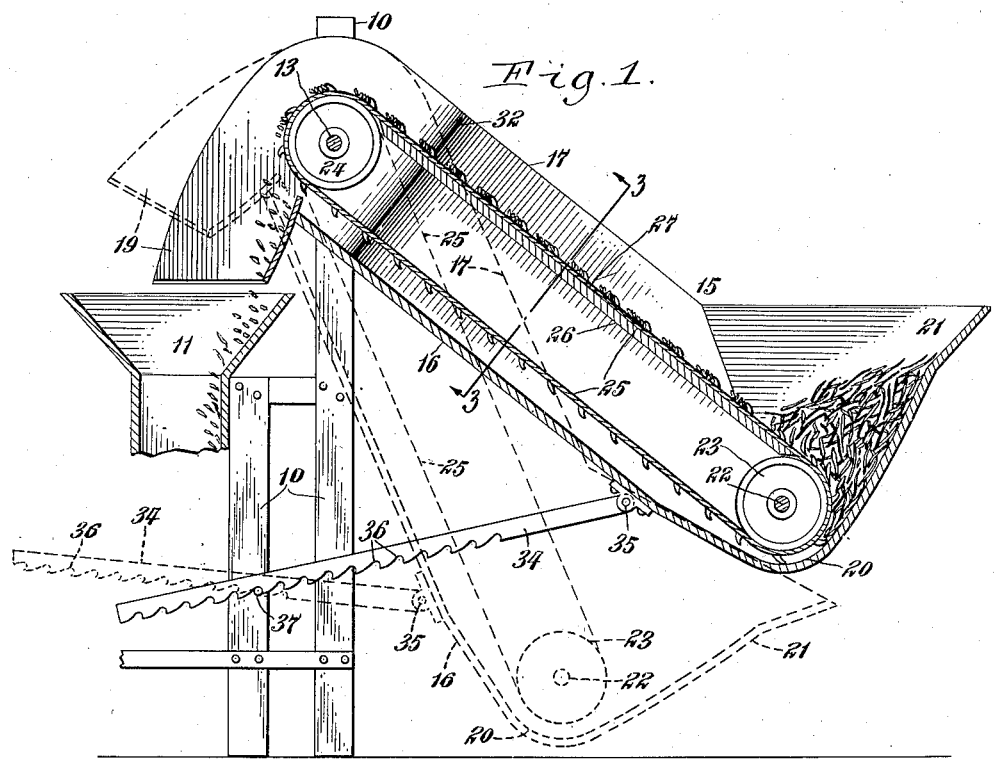
Figure 2:
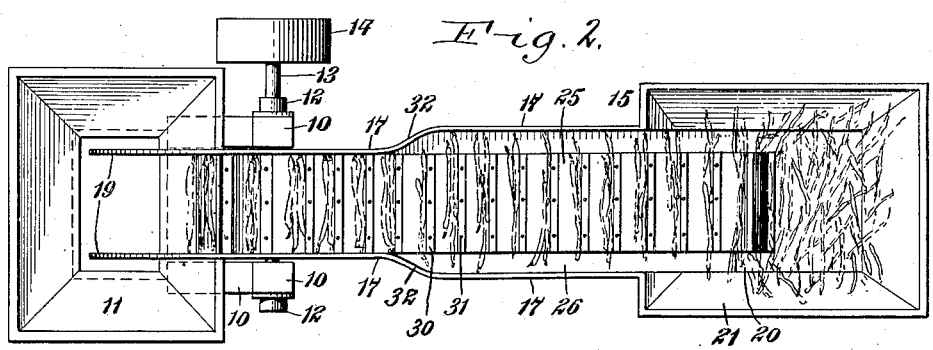

In the accompanying drawings:

Figure 1 is a vertical longitudinal section through the complete variable feeder. Figure 2 is a top plan thereof. Figure 3 is an enlarged and substantially vertical, transverse section through the feeder taken on line 3—3, Fig. 1. Figure 4 is a fragmentary, enlarged, vertical longitudinal section through the endless belt conveyor and taken on line 4—4, Fig. 3. Figure 5 is a vertical enlarged section similar to Fig. 4, but with the belt conveyor arranged at a different inclination. Figure 6 is a greatly enlarged, vertical longitudinal section through the belt conveyor taken on line 6—6, Fig. 3, and showing the means of securing the carrying cleats to the belt conveyor.

Similar characters of reference indicate corresponding parts throughout the several views.

10 represents a main stationary frame which may be of any suitable form and which has arranged thereon a suitable discharge hopper 11 into which the vegetables or other material is normally fed in regular, constant quantities. The material which falls into said discharge hopper 11 may pass to any desired machine (not shown) for treating the material in any desired way; for instance, if the material being handled is string beans, the latter may pass from said discharge hopper 11 into a bean snipping machine.

Journaled horizontally in bearings 12 on said main frame 10 is a transverse power shaft 13 which carries a suitable belt pulley 14 on its one outer end, the latter being adapted to be belted to any suitable available source of power for rotating the same. Pivotally mounted on said power shaft 13 is a longitudinally disposed tiltable frame 15 which may, of course, be pivotally mounted directly upon the main frame 10, if desired, but in any case the tiltable frame is mounted coaxially with respect to the power shaft 13. This tiltable frame comprises a longitudinal, transverse, bottom plate 16, two longitudinal vertical side walls 17 projecting upwardly from the opposite edges of said bottom plate, a discharge spout 19 at its upper end opening upwardly into said bottom plate 16; a transversely disposed, semi-cylindrical bottom 20 forming a continuation of said bottom plate 16, and a feeding hopper 21 forming an upward extension of said side walls 17 and located above said semi-cylindrical bottom 20.

Journaled transversely in the lower end of said tiltable frame 15 and disposed coaxially with respect to the said semi-cylindrical bottom 20 thereof, is a driven shaft 22 to which is centrally secured a driven conveyor pulley 23. Secured to the aforementioned power shaft 13 is a driving conveyor pulley 24. Arranged longitudinally of the tiltable frame is a belt conveyor 25 whose opposite turns or bends engage with said driving and driven conveyor pulleys 24 and 23, respectively. The upper stretch of said belt conveyor is supported by a longitudinal supporting plate 26 which is preferably provided with the recess 27 (see Fig. 3), so that the upper surface of said belt conveyor is flush with the upper surface of said supporting plate 26. This recess 27 is only slightly greater in width than the width of the belt conveyor 25.

Secured by rivets 29 or otherwise (see Fig. 6) to said belt conveyor 25 are a plurality of transverse carrying members or cleats 30 whose opposite ends open laterally outwardly and are preferably provided with the concave retaining sides or mouths 31 for the purpose of increasing the carrying capacity of each individual cleat.

As best seen in Fig. 2, the side walls 17 of the tiltable frame 15 are spaced laterally apart a distance considerably greater than the width of the belt conveyor 25. This permits the string beans or other material being handled to easily and freely drop from the feeding hopper 21 onto the cleats 30 of the belt conveyor 25. That is, the full length of each cleat is made completely available as a carrying medium. At the upper end of the tiltable frame 15 however, the side walls 17 converge at 32 so that above the point 32 the distance between the inner faces of said side walls 17 is only very slightly greater than the width of the belt conveyor 25. By this construction, each cleat 30 while passing under the feeding hopper 21 is given a full load, but when said cleat passes the point 32, any articles which may be projecting laterally beyond the opposite ends of said cleats are caused to be moved centrally toward the central part of said cleat. It is thus apparent that the string beans or other material which is being continuously discharged from the upper end of said belt conveyor 25 into the discharge hopper 11 is not only constant in quantity but is accurately alined in a transverse position and is also confined between definite lateral limits.

Assuming the belt conveyor to be driven at a constant speed, as is the case in actual practice, it is sometimes very desirable to alter the total quantity of material being fed per second into the aforesaid discharge hopper 11. For this purpose (see dotted lines Fig. 1), an adjustment bar 34 is provided, having its forward end pivoted at 35 to the tiltable frame 15 while its rearward lower face is provided with a plurality of detaining teeth or notches 36, any one of which is adapted to engage with a stationary, detaining pin 37 secured to the main frame 10. To change the inclination of the tiltable frame 15 with its belt conveyor 25, it is merely necessary to lift the rear end of said adjustment bar 34, shift the tiltable frame to any desired position and then lower the rear end of said adjustment bar so that one of its teeth 36 engages with the said stationary pin 37. That this shifting of the position of the tiltable frame 15 about the shaft 13 does actually alter or affect the quantity of material carried by each of the cleats 30, is graphically shown by comparing Fig. 4 with Fig. 5, the latter showing a steeper inclination of the belt conveyor and hence a smaller carrying capacity for each cleat.

The operation of the machine is as follows:

The string beans or other material is shoveled or othewise deposited in comparatively large and irregular quantities into the receiving or feeding hopper 21 where the same is picked up by the forward sides or mouths 31 of the cleats 30 which latter are secured by rivets 29 to the belt conveyor 25. As these cleats pass the point 32 of the side walls 17 of the tiltable frame 15, the string beans or other material projecting laterally beyond the outer ends of said cleats is pushed inwardly approximately flush with the ends of said cleats. The material carried by said cleats is deposited into a stationary discharge hopper 11. To adjust the amount of material flowing per second from the feeding hopper 21 to the discharge hopper 11, the adjustment bar 34 is raised and any desired one of its teeth 36 engaged with the stationary pin 37 secured to the stationary main frame 10.

I claim as my invention:

1. A variable feeder comprising a main frame, a longitudinally disposed tiltable frame pivoted transversely on said main frame and provided with a transverse semi-cylindrical bottom, a feeding hopper arranged above said semi-cylindrical bottom, an upper, transverse power shaft journaled in said tiltable frame and forming the axis about which said tiltable frame is pivoted, a lower driven shaft journaled transversely in the lower end of said tiltable frame coaxially with the semi-cylindrical bottom thereof, a conveyor belt passing around said power and said driven shafts, and transverse carrying members secured to said belt and arranged to move in juxtaposition to the concave surface of said semi-cylindrical bottom of said tiltable frame.

2. A variable feeder comprising a longitudinal guide way having its feeding end broad and its discharge end narrow, a conveyor arranged in said guideway and arranged to move through the broad feeding end of said guideway and through the narrow discharge end thereof and having a width equal to the narrow discharge end but spaced at its sides from the sides of the broad feeding end, and carrying members secured to said conveyor and having their lateral ends opening outwardly.

3. A variable feeder comprising a main frame, an upper power shaft journaled in said main frame, a tiltable frame pivoted on said power shaft and provided with a transverse guideway which is broadened at its lower end and narrowed at its upper end, a lower driven shaft journaled in said tiltable frame, an endless belt conveyor arranged on said power and said driven shafts and moving through said broadened lower and narrowed upper ends of the guideway, and arranged at its opposite edges close to the sides of the narrowed part of the guideway but spaced at its opposite edges a considerable distance from the sides of said broadened part of the guideway, and transverse cleats open at their lateral ends and secured to said belt conveyor.

WILLIAM F. PROBST.